United States Patent [19]

Gilbert et al.

[11] 4,173,697

[45] * Nov. 6, 1979

[54] CONTINUOUS HIGH PRESSURE MASS PROCESSES FOR THE POLYMERIZATION OF ETHYLENE

[75] Inventors: Ronald E. Gilbert, Katy; Thomas J. Lynch, Houston; Robert J. Rowatt, Orange, all of Tex.

[73] Assignee: Gulf Oil Corporation, Pittsbrugh, Pa.

[*] Notice: The portion of the term of this patent subsequent to Jun. 19, 1996, has been disclaimed.

[21] Appl. No.: 907,517

[22] Filed: May 19, 1978

Related U.S. Application Data

[63] Continuation-in-part of Ser. No. 838,777, Oct. 3, 1977, abandoned, which is a continuation-in-part of Ser. No. 835,267, Sep. 21, 1977, abandoned.

[51] Int. Cl.$^2$ .......................... C08F 4/28; C08F 10/02
[52] U.S. Cl. ................... 526/74; 260/23 H; 260/45.7 R; 526/216; 526/218; 526/220; 526/227; 526/352.2

[58] Field of Search ............... 106/271, 272; 252/426 R, 429 A, 430; 260/42.14, 610 R, 23 H, 45.7 R; 526/1, 64, 86, 88, 106, 130, 159, 169, 169.2, 227, 352.2, 901, 903, 919, 220, 216, 74

[56] References Cited

U.S. PATENT DOCUMENTS

| | | | |
|---|---|---|---|
| 3,061,601 | 10/1962 | Watt ................................... | 526/901 |
| 3,657,210 | 4/1972 | Minkhorst ........................... | 526/919 |
| 3,849,334 | 11/1974 | Frielingsdorf et al. .............. | 526/903 |
| 3,884,857 | 5/1975 | Ballard et al. ...................... | 526/227 |
| 4,002,813 | 1/1977 | Steinert et al. ...................... | 526/86 |

*Primary Examiner*—Edward J. Smith
*Attorney, Agent, or Firm*—Richard L. Kelly

[57] ABSTRACT

A process is provided for the continuous high-pressure mass polymerization of ethylene in which novel means are employed to continuously introduce the free radical generating polymerization initiator into the polymerization zone. The process is carried out by pumping into the polymerization a Bingham fluid which has a free-radical generating polymerization initiator uniformly dispersed throughout a solid continuous phase, which is a mixture of a wax and a liquid hydrocarbon.

8 Claims, 1 Drawing Figure

CONTINUOUS HIGH PRESSURE MASS PROCESSES FOR THE POLYMERIZATION OF ETHYLENE

CROSS REFERENCE TO RELATED APPLICATIONS

The present application is a continuation-in-part of our earlier filed application Ser. No. 838,777, filed on Oct. 3, 1977, which is a continuation-in-part of our earlier application Ser. No. 835,267, filed on Sept. 21, 1977, both of said applications now abandoned.

The copending application of Thomas J. Lynch and Robert J. Rowatt Ser. No. 907,445, filed on May 19, 1978, discloses certain of the Bingham fluid compositions employed in the process of this invention. This application is assigned to the assignee of the present application.

BACKGROUND OF THE INVENTION

In a continuous high pressure mass process for the polymerization of ethylene, compressed ethylene and a free-radical generating polymerization initiator are fed continuously to the polymerization zone while product is continuously withdrawn from the polymerization zone. As this process has been developed and refined, operators of the process have been able to modify the process to improve its efficiency or to modify the properties of the ethylene polymers being produced by employing newer types of polymerization initiators. The process also can be modified by injecting two or more different polymerization initiators into different sections of the polymerization zone. Where such techniques are employed, the polymerization initiators are selected so that they decompose and generate free radicals at different temperatures.

While such processes are employed to produce large volumes of ethylene polymers, certain undesired steps must be taken to feed the polymerization initiator to the polymerization zone. This results from the fact that most of such polymerization initiators are solids. It is virtually impossible to continuously feed finely-divided solids into a high pressure reactor. As a consequence, it has been standard practice in the art to dissolve such polymerization initiators in an inert solvent and to pump such polymerization initiator solutions into the polymerization zone. As a large percentage of all high pressure ethylene polymers are employed as wrapping films for food products, the solvents employed for this purpose must have received prior F.D.A. approval. Unfortunately, many polymerization initiators of interest to the art have limited solubility in F.D.A. approved solvents. The use of dilute solutions of polymerization initiators to feed polymerization initiators to the polymerization zone concomitantly introduces significant quantities of inert hydrocarbons into the polymerization zone. This is undesirable for several reasons. For one, many of the hydrocarbon solvents employed function as telogenating agents and alter the properties of the ethylene polymers being produced. For another, the hydrocarbon solvent must be removed from the unconverted ethylene before it is recycled to the reactor. This removal step represents a significant cost burden in the process.

In addition to the general problems discussed above, certain desirable polymerization initiators have such limited solubility in F.D.A. approved solvents that they cannot be used in such ethylene polymerization processes.

In view of the above-discussed problems, it would be desirable to have available to the art improved and more versatile methods for feeding free-radical generating polymerization initiators to continous high pressure ethylene polymerization processes.

SUMMARY OF THE INVENTION

The applicants have discovered that free radical-generating polymerization initiators can be introduced into a high pressure ethylene polymerization zone on a continuous basis by pumping into the polymerization bone a Bingham fluid* which has the free-radical generating polymerization initiator uniformly dispersed throughout a continuous solid phase which is a mixture of a wax and a liquid hydrocarbon.

*A Bingham fluid, sometimes referred to as a Bingham body, is a material which is a solid at a particular temperature under consideration, usually ambient temperature, but which will flow when subjected to an applied shearing stress which exceeds a minimum value characteristic of the system under consideration. For a description of the characteristics of Bingham fluids, see RHEOLOGY by Fredrick Eirich, Academic Press Inc., New York City, Library of Congress Catalog Card 56-11131, particularly Volume 3, pages 198–201.

DETAILED DESCRIPTION OF THE INVENTION

Figure 1:
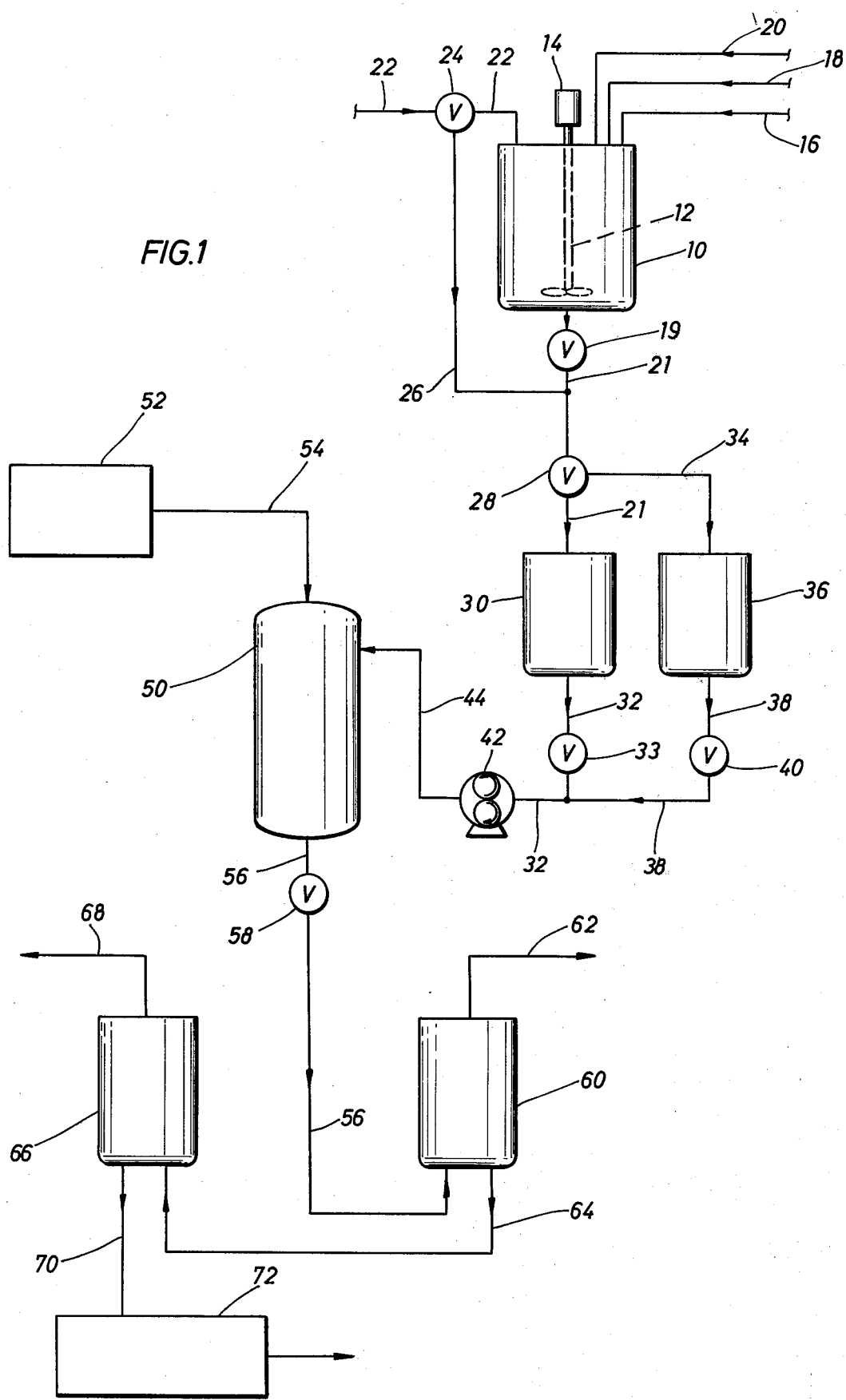
FIG. 1 is a schematic representation of apparatus which can be employed to carry out the process of the invention.

The continuous solid phase* of the Bingham fluid compositions of the invention consists of an intimate mixture of 100 parts by weight of a suitable wax and about 40–250 parts and preferably about 80–150 parts by weight of a liquid hydrocarbon. In special cases subsequently discussed, the wax and the liquid hydrocarbon can be employed in proportions outside of these ratios.

*The continuous solid phase customarily serves merely as a carrier for the functional material. In special cases subsequently described, one or both components of the continuous solid phase can play a functional role.

The continuous solid phase of the Bingham fluid compositions of the invention, in most instances, is not a true solid in a classical chemical and physical sense. Rather, it is a network of extremely finely-divided wax particles dispersed throughout the liquid hydrocarbon. In many instances the wax particles may be bonded to each other in a semi-crystalline lattice. In certain physical characteristics, the continuous solid phase resembles a gel. Regardless of its precise chemical and/or physical state, for the purpose of describing and claiming the invention, the wax-liquid hydrocarbon mixtures will be characterized simply as a "continuous solid phase."

The wax component included in the Bingham fluid compositions of the present invention can be any of the known waxes, provided that it meets each of the following criteria:

1. At least 30 parts of the wax will be dissolved in 100 parts of n-heptane at 80° C.

2. A solution prepared per (1) above, when cooled to 20° C., forms a continuous solid phase having the characteristics described earlier herein.

3. The continuous solid phase prepared per (2) above will flow when subjected to a shear stress of 50 sec$^{-1}$. Suitable waxes are described in the *Kirk-Othner Encyclopedia of Chemical Technology*, Interscience Publishers, New York City, Second Edition, Library of Congress Card 63-1438, Vol. 22, pages 156–173, which description is incorporated herein by reference. Such waxes include the (a) animal waxes, e.g., bees wax, spermaceti wax, Chinese insect wax and shellac wax; (b) vegetable waxes, e.g., carnauba wax, candelilla wax, hydrogenated castor oil, ouricury wax, Japan wax, and bayberry wax; (c) mineral waxes, e.g., peat wax, montan wax, ozocerite wax, and petroleum waxes; and (d) synthetic waxes such as low molecular weight polyethylenes (which frequently are partially oxidized) and oxidized hydrocarbon waxes prepared from Fischer-Tropsch paraffins. The animal and vegetable waxes, while complex mixtures, are principally esters of a long chain fatty alcohol and a long chain fatty acid, although certain of the natural waxes also contain significant quantities of monoglycerides of long chain fatty acids such as glyceryl monostearate.

The preferred waxes for use in Bingham fluid compositions that are stored and used at ambient temperature, i.e., about 10° to 40° C., are the hydrocarbon waxes such as the petroleum waxes. Such hydrocarbon waxes are preferred by reason of their chemical inertness and their commercial availability in large volume at modest cost.

The petroleum waxes employed can be any one of the three principal categories of the petroleum waxes more specifically a paraffin wax, an intermediate wax, or a microcrystalline wax. As is recognized in the art paraffin waxes are predominately normal paraffins, straight chain saturated hydrocarbons which may contain minor amounts of isoparaffins. The mirocrystalline waxes are predominately cyclic saturated hydrocarbons (naphthenes) and isoparaffins. The intermediate waxes are blends or mixtures of paraffin and microcrystalline waxes. Table I below sets forth certain of the physical and chemical properties of these three classes of waxes.

TABLE I

|  | Paraffin | Intermediate | Microcrystalline |
|---|---|---|---|
| Melting Point Range, ASTM D127° F. | 120–160 | 130–160 | 130–180 |
| Molecular Weight Range | 340–400 | 360–550 | 500–600 |
| Density Range | 0.80–0.917 | 0.85–0.93 | 0.89–0.94 |
| Gravity ASTM D287 °API, 210° F. | 35–60 | 30–55 | 30–50 |
| Distillation, Vacuum Corrected to 760 mm Hg 5% point, °F. | 750–810 | 825–900 | 950–1,050 |

A typical paraffin wax has the following properties:

| Gravity ASTM D287 °API | 41.3 |
|---|---|
| Melting point ASTM D87 °F. | 140.1 |
| Congealing point ASTM D938 °F. | 138.0 |
| Penetration ASTM D1321 at 77° F. | 14.0 |
| at 100° F. | 40.0 |
| Flash point, °F. | 455.0 |
| Ultraviolet absorbitivity at 280 mμ ASTM D2008 | 0.01 |
| Iodine number | 0.4 |
| Molecular weight | 442.0 |
| Refractive index | 1.4359 |
| Distillation vacuum corrected to 760 mm. Hg 5% point, °F. | 804.0 |

It is known that certain of the petroleum waxes, depending upon their source, contain minor quantities of chemicals containing nitrogen, oxygen and/or sulfur atoms. Such minor components are difficult to remove. If such components are objectionable, equivalent hydrocarbon waxes can be prepared by synthetic methods, as by hydrogenating synthetic higher mono-1-olefins, particularly the $C_{18}$ to $C_{30}$ monoolefins. Alternatively, such mono-1-olefins themselves can be employed as the wax.

The liquid hydrocarbon included in the compositions of the invention can be any of the common hydrocarbons of either the aliphatic or aromatic type. It is preferred to employ relatively low boiling aliphatic hydrocarbons, particularly the pentanes, hexanes, heptanes, and octanes.

The wax and the liquid hydrocarbons, when heated to a temperature sufficiently high to melt the wax and subsequently cooled to ambient temperature, provide thick mobile, single phase wax-like solids*. These blends, while solid at ambient temperature and pressure, flow readily under modest pressures of less than about 100 psig.

*Since the continuous phase consists of a blend of two hydrocarbons, the transition between the solid state and the liquid state is not sharp. For the purpose of this invention, the continuous phase is considered to be a solid if it has the capability of holding the dispersed solids in suspension without significant settling for a period of 30 days at ambient temperature.

The precise physical characteristics of the wax-liquid hydrocarbon solids blend will depend somewhat upon the chemical type and the boiling point of the liquid hydrocarbon, and the chemical type and melting point of the wax employed. The ratio of the two components also has an effect upon the physical properties of the resultant blends. It has been observed, however, that by proper selection of the wax and the liquid hydrocarbon, and the proportions of the two components, it is possible to prepare compositions that are homogeneous at ambient temperature and will retain their single phase solid state over the normal range of ambient temperature encountered in the temperature zone, specifically from about 10° C. to about 40° C. Compositions of optimum properties are obtained when a hydrocarbon wax having a melting point in the range of about 60°–80° C. is blended with a $C_5$–$C_{10}$ aliphatic hydrocarbon, with about 80 to 150 parts of liquid hydrocarbon being employed per 100 parts of the hydrocarbon wax.

The continuous solid phase of the Bingham fluids described above, by reason of being based on a hydrocarbon that is a liquid at ambient temperature, are solids at ambient temperature and atmospheric pressure. If the Bingham fluids are to be employed at subambient temperatures and/or stored at pressures above atmospheric, it is possible to employ in the continuous solid phase lower boiling hydrocarbons such as butane, butene-1, propane, propylene, or ethylene. These lower boiling hydrocarbons, for the limited purpose of the present invention, are considered to be liquid hydrocarbons.

It will be recognized, of course, that such systems must be maintained at temperatures and pressures below the critical point of the liquid hydrocarbon included in the Bingham fluid composition. The critical point of ethylene is 9.9° C. and 50.5 atmospheres. The use of ethylene as the liquid hydrocarbon in the Bingham fluid compositions is indicated where it is desired to hold the introduction of extraneous compounds into the polymerization zone to an absolute minimum.

Where a Bingham fluid composition is employed containing a liquid hydrocarbon of the type described in the second paragraph above and is stored at a temperature below 10° C., it is feasible and usually desirable to employ as the wax an aliphatic hydrocarbon which is a liquid at the critical temperature of the liquid hydrocarbon, but which is a wax-like solid at the temperature at which the Bingham fluid composition is to be stored.

$C_{15}$ or lower aliphatic hydrocarbon can be employed, with $C_{10}$ to $C_{15}$ aliphatic hydrocarbons being preferred. Mixtures of ethylene and dodecane or tetradecane may be used with advantage as the continuous solid phase of such Bingham fluid compositions.

The free radical generating polymerization initiators to be employed in the Bingham fluid compositions can be of any chemical type that decomposes to generate free radicals at an appropriate rate at the polymerization temperatures employed in the mass polymerization of ethylene. Typically, these initiators decompose at a rate such that one-half of the initiator decomposes in 10 hours at a temperature in the range of about 50°–130° C. Appropriate initiators of this type are widely reported in the literature. The maximum benefits of the invention are obtained when the polymerization initiators have limited solubility in liquid aliphatic hydrocarbons. Examples of suitable polymerization initiators included peroxides such as decanoyl peroxide, and azo initiators such as 2,2'-azo-bis-isobutyronitrile and azo-bis-isobutyramidine. Most free radical generating polymerization initiators, in their purified state, are solids. By reason of their potentially explosive nature, however, many of these compounds are supplied as solutions (principally in hydrocarbon solvents). These solutions can be incorporated directly into the Bingham fluid compositions without further purification.

An attractive feature of the invention is that additional materials desirably to be incorporated into the polymerization zone can be included in the Bingham fluid compositions. Among the additional materials that can be incorporated into the Bingham fluid compositions are comonomers such as vinyl acetate, alkyl esters of acrylic or methacrylic acid; mono-1-olefins, including, inter alia, butene-1, hexene-1, octene-1; and higher mono-1-olefins containing up to about 30 carbon atoms. Another type of material that can be included in the Bingham fluid composition includes telogenating agents such as propane, nitrobenzene, nitrosobenzene, stilbene quinones, picrylhydrazyl, and the like. The mono-1-olefins described immediately above also function as telogenating agents.

In selected special cases, a functional material included in the Bingham fluid composition can serve as a partial or complete replacement for either the wax or liquid hydrocarbon included in the continuous solid phase of the Bingham fluid composition. Thus a binary mixture of a hydrocarbon wax and propane can be used to inject propane into the high pressure ethylene polymerization system to function as a telogenating agent. In this composition, the propane serves the dual function as the liquid hydrocarbon component of the solid continuous phase and as a functional telogenating agent. Similarly, a binary mixture of a hydrocarbon wax and a liquid mono-1-olefin such as hexene can be used to inject hexene into the ethylene polymerization system. The hexene serves the dual function as the liquid hydrocarbon component of the continuous phase and as a functional comonomer and/or telogenating agent. As earlier noted, higher mono-1-olefins such as $C_{20}$ to $C_{30}$ mono-1-olefins are waxes. For this reason, a binary mixture of a $C_{30}$ mono-1-olefin and hexane can be used to inject the $C_{30}$ mono-1-olefin into the ethylene polymerization system to function as a comonomer.

The percentage of the polymerization initiators to be dispersed in the Bingham fluid compositions of the invention can be varied over a wide range and normally will be set to facilitate the incorporation of the appropriate quantity of the polymerization initiator into the polymerization zone. Customarily, the polymerization initiator will be dispersed in the Bingham fluid compositions of the invention in the range of about 1–60 weight %, preferably about 1–40 weight %, and especially about 5–20 weight % of the total composition. Where it is desired to add additional components to the polymerization system, such other components may be incorporated into the Bingham fluid together with the desired polymerization initiator.

The physical state of the Bingham fluid composition will depend upon the solubility of the polymerization initiator in the continuous solid phase. If the polymerization initiator is soluble, the final composition will be a homogeneous single phase solid. If the polymerization initiator is insoluble, the composition will be a heterogeneous system in which a small quantity of solid polymerization initiator is dispersed in the larger solid phase which consists of the wax and the liquid hydrocarbon.

The Bingham fluid compositions employed in the invention are preferably prepared by heating the desired proportions of the wax and the liquid hydrocarbon in a stirred vessel and adding the polymerization initiator thereto. This mixture is agitated with sufficient intensity to disperse the initiator uniformly throughout the melt, after which the entire composition is cooled until it solidifies. The solidified mixture then is transferred to a suitable storage vessel. The compositions can be prepared in apparatus of the type illustrated in FIG. 1.

The apparatus illustrated in FIG. 1 contains a reactor 10 provided with a stirrer 12 driven by a motor 14. The reactor 10 is constructed so that it can operate under an applied pressure of at least about 100 psig. Lines 16, 18, and 20 are provided to feed to the reactor, respectively, a liquid hydrocarbon, a wax, and free radical generation polymerization initiator. A gas line 22 fitted with a two-way valve 24 is provided so that the reactor 10 can be pressurized to discharge the Bingham fluid composition from reactor 10 via outlet line 21, which contains a valve 19. Line 21 is connected to storage vessel 30. A two-way valve 28 is provided in line 21 so that the Bingham fluid composition from reactor 10 also can be fed through line 34 to a second storage vessel 36 which is maintained in parallel with storage vessel 30. A transfer line 32 equipped with a valve 33 is provided in storage tank 30 so that the Bingham fluid composition contained therein can be transferred therefrom by means of gear pump 42. In a like manner, a line 38 equipped with a valve 40 is provided in storage tank 36 for feeding the Bingham fluid composition through line 32 to gear pump 42.

In the preparation of the Bingham fluid composition, a melted wax is introduced into reactor 10 through line 16. Liquid hydrocarbon is fed to reactor 10 through line 18. The wax and the liquid hydrocarbon are maintained at a temperature sufficiently high to keep the mixture liquid and are stirred to provide a homogeneous liquid phase. The desired polymerization initiator then is fed to reactor 10 via line 20. Stirring is continued to thoroughly disperse the polymerization initiator in the continuous liquid phase. The contents of the reactor 10 then are cooled to the point at which the total composition is just above the gel point. The lines 16, 18, and 20 then are sealed by suitable valves not shown and the reactor is pressurized by an inert gas introduced into the reactor via line 22. Valves 19 and 28 are opened and the Bingham fluid composition in reactor 10 is transferred via line 21 to storage tank 30.

To assure that an adequate supply of Bingham fluid composition is available at all times, the operations above-described are repeated with the exception that valve 28 is turned so that the Bingham fluid composition prepared in reactor 10 is transferred to the second storage tank 36.

With the storage tanks 30 and 36 filled with the desired Bingham fluid composition, the apparatus is in a condition to feed the Bingham fluid composition into an ethylene polymerization reactor 50. Valve 19 is closed and valves 24 and 28 are set so that gas from line 22 is fed through line 26 into line 21 so as to apply a pressure on the contents of storage tank 30. The pressure applied on storage tank 30 converts the Bingham fluid composition to the liquid phase and forces the composition through line 32 and valve 33 to gear pump 42 which feeds the composition through line 44 into the polymerization reactor 50. Polymerization reactor 50 is a high pressure stirred autoclave which typically will operate at pressures in excess of 1,000 atmospheres and temperatures in excess of 200° C. Polymerization grade ethylene is fed to reactor 50 from compressor 52 via line 54 Product is continuously discharged from reactor 50 via line 56 and valve 58, and typically will contain 10–15 weight % ethylene polymer and the balance unconverted ethylene. Line 56 discharges into a high pressure separator 60 which typically operates at a pressure of about 200 atmospheres and a temperature of about 230° C. Unpolymerized ethylene, the wax component of the Bingham fluid, and the liquid hydrocarbon component of the Bingham fluid are discharged via line 62 for recovery and/or recycling. The molten ethylene polymer is transferred via line 64 to a low pressure separator 66 which typically operates at a pressure of about 10 atmospheres and at a temperature of about 200° C. Any residual volatile products are recovered via line 68 and the molten polymer is discharged via line 70 to an extruder 72.

To prepare Bingham fluid compositions containing a normally gaseous hydrocarbon such as ethylene as the liquid hydrocarbon component of the Bingham fluid compositions, it is necessary to operate at reduced temperatures and elevated pressures. The reactor 10 is charged with a hydrocarbon such as tetradecane (which will function as the wax) and the free radical polymerization initiator, preferably charged as a solution in a liquid hydrocarbon. The mixture is stirred well and ethylene is admitted to reactor 10 at a pressure well in escess of 50.5 atmospheres. Reactor 10 then is cooled to a temperature well below 9.9° C. to liquify the ethylene. As the composition in reactor 10 is about to solidify, valves 19 and 28 are opened to transfer the Bingham fluid composition to storage vessel 30 which will be maintained well below 9.9° C. Valve 19 then is closed and valves 24 and 28 are adjusted so that storage vessel 30 is maintained under an ethylene pressure in excess of 50.5 atmospheres. When valve 33 is opened, the Bingham fluid composition will flow through line 32 to gear pump 42. Line 32, valve 33, and gear pump 42 will be maintained at a temperature below 9.9° C.

In many instances, it is desirable to incude baffles in an autoclave reactor to provide a series of polymerization zones which are operated at different temperatures. In such operations, two different free radical generating polymerization initiators are employed which decompose at different temperatures. The initiators are introduced into separate polymerization zones. In this embodiment of the invention, two separate Bingham fluids can be introduced into the reactor via separate entry ports. Alternatively, one initiator can be introduced in a Bingham fluid with the second initiator being introduced as a solution in an appropriate solvent.

The following examples are set forth to illustrate more clearly the principle and practice of this invention to those skilled in the art. When parts and percentages are mentioned, they are parts and percentages by weight unless otherwise specifically noted.

EXAMPLE 1

Part A

A paraffin wax* having a melting point of 54°–56° C., in the amount of 716 gms, was melted and charged to reactor 10 which had a 3-liter capacity. The melted wax was cooled to a temperature of about 65° C. and 500 ml of n-heptane was charged to the reactor. The contents of the reactor were cooled to about 55° C. and 100 gms of finely-divided decanoyl peroxide slurried in 200 ml of n-heptane was charged to the reactor. Stirring was continued until the temperature was reduced to 40° C., at which point incipient solidification of the composition began to take place. Valves 19 and 28 were opened and a nitrogen pressure of 50 psig was introduced into reactor 10 by line 22 to transfer the contents of reactor 10 to storage tank 30.

*The wax was a synthetic paraffin prepared by hydrogenating a mixture of synthesized mono-1-olefins containing about 30 carbon atoms.

Part B

The composition of Part A was used to polymerize ethylene in a one-zone stirred autoclave having a 12-inch internal diameter. The reactor was operated at a pressure of about 18,000 psig with the temperature varying from 325° F. to 500° F. in different sections of the reactor. The composition of Part A was introduced at a steady rate to provide the equivalent of one pound of catalyst for each one thousand pounds of polymer being produced. Polymer was produced at a rate of about 2,000 lbs/hr. The polyethylene produced had a melt index of about 2.5 and a density of about 0.92.

While the process of the invention as described above is directed to a method for feeding a polymerization initiator (optionally in admixture with other functional materials such as comonomers and telogenating agents) into a high pressure ethylene polymerization zone, a modification of the process can be employed to inject other types of functional materials into such a polymerization zone to achieve other purposes. By way of example, in discharging the ethylene polymer product from the reactor to the high pressure separator the temperature of the polymer is increased by reason of a reverse Joule-Thompson effect. It is believed that gels are formed in the ethylene polymer by reason of the increase in temperature at this point in the manufacturing process. This problem can be ameliorated by injecting into the reactor, preferably immediately upstream from the reactor discharge port, a Bingham fluid composition of the type described and having a resin heat stabilizer dispersed therein. This type composition should be injected at a rate to provide a maximum of about 0.2 weight % of stabilizer, based on the ethylene polymer being produced.

As another example, it is known that highly crosslinked ethylene polymers are deposited on the interior surfaces of autoclave reactors employed to polymerize ethylene. It is believed that small particles of such cross-linked polymers flake off of the principal deposits and are carried into the fresh ethylene polymer being produced in the autoclave. This is believed to be a factor which adversely affects the optical properties of the ethylene polymers produced in autoclave reactors. The applicants have discovered that the buildup of such cross-linked ethylene polymer products can be retarded by adding to the reactor small quantities of an amide of a long chain fatty acid, preferably one containing 12 or more carbon atoms. Typical examples include oleamide and and erucamide. These amides can be incorporated into a Bingham fluid composition of the type described. They should be injected into the reactor to provide a maximum of about 0.2 weight % of the amide based on the ethylene polymer being produced.

While heat stabilizers and/or fatty acid amides can be included in the Bingham fluid composition containing the free radical polymerization initiator, it is preferred to feed such materials to the reactor in separate Bingham fluid compositions.

What is claimed is:

1. In a continuous high pressure process for the mass polymerization of ethylene in which ethylene and a free radical generating polymerization initiator are fed continuously to a polymerization zone operating at an elevated temperature and at a pressure of at least about 1,000 atmospheres; the improvement which consists essentially of feeding the polymerization initiator to the polymerization zone on a continuous basis by pumping a Bingham fluid composition into the polymerization zone, said Bingham fluid composition being a solid at ambient temperature and consisting essentially of a free-radical generating polymerization initiator uniformly dispersed in a continuous solid phase which consists essentially of an intimate mixture of a wax and a liquid hydrocarbon.

2. A process of claim 1 in which the polymerization initiator is decanoyl peroxide.

3. A process of claim 1 or 2 in which the continuous solid phase of the Bingham fluid composition consists essentially of 100 parts by weight of a hydrocarbon wax and about 40 and 250 parts by weight of the liquid hydrocarbon.

4. In a continuous high pressure mass process for the polymerization of ethylene in which ethylene and a free radical generating polymerization initiator are fed continuously to a polymerization zone operating at an elevated temperature and at a pressure of at least about 1,000 atmospheres; the improvement which consists essentially of feeding the polymerization initiator to the polymerization zone on a continuous basis by pumping a Bingham fluid composition into the polymerization zone, said Bingham fluid composition being a solid at subambient temperatures and consisting essentially of a free-radical generating polymerization initiator uniformly dispersed in a continuous solid phase which consists essentially of an intimate mixture of 100 parts by weight of a $C_{10}$ to $C_{15}$ aliphatic hydrocarbon and about 40 to 250 parts by weight of ethylene.

5. In a continuous high pressure process for the mass polymerization of ethylene in which ethylene and a free radical generating polymerization initiator are fed continuously to a polymerization zone operating at an elevated temperature and at a pressure of at least about 1,000 atmospheres and ethylene polymer is continuously discharged to a zone of lower pressure and in passing to the lower pressure zone increases in temperature by reason of a reverse Joule-Thompson effect; the improvement which consists essentially of feeding a heat stabilizer to the polymerization zone on a continuous basis by pumping a Bingham fluid composition into the polymerization zone, said Bingham fluid composition being a solid at ambient temperature and consisting essentially of a heat stabilizer uniformly dispersed in a continuous solid phase which consists essentially of an intimate mixture of a wax and a liquid hydrocarbon; said heat stabilizer reducing the gels which form by the increase in temperature in the polymer in passing into said lower pressure zone.

6. A process of claim 5 in which the Bingham fluid composition is a solid at a subambient temperature and the continuous solid phase consists essentially of an intimate mixture of 100 parts by weight of a $C_{10}$ to $C_{15}$ aliphatic hydrocarbon and about 40 to 250 parts by weight of ethylene.

7. In a continuous high pressure process for the mass polymerization of ethylene in which ethylene and a free radical generating polymerization initiator are fed continuously to a stirred autoclave reactor operating at an elevated temperature and at a pressure of at least about 1,000 atmospheres and deposits of highly cross-linked ethylene polymer are deposited on the interior surfaces of the autoclave and flake off into the fresh ethylene polymer being produced in said autoclave; the improvement which consists essentially of feeding a fatty acid amide to the polymerization zone on a continuous basis by pumping a Bingham fluid composition into the polymerization zone, said Bingham fluid composition being a solid at ambient temperature and consisting essentially of a fatty acid amide uniformly dispersed in a continuous solid phase which consists essentially of an intimate mixture of a wax and a liquid hydrocarbon; said fatty acid amide being an amide of a fatty acid containing at least about 12 carbon atoms and retarding the buildup of cross-linked ethylene polymer in the autoclave reactor.

8. A process of claim 7 in which the Bingham fluid composition is a solid at a subambient temperature and the continuous solid phase consists essentially of an intimate mixture of 100 parts by weight of a $C_{10}$ to $C_{15}$ aliphatic hydrocarbon and about 40 to 250 parts by weight of ethylene.

* * * * *